(12) United States Patent
Van De Sluis et al.

(10) Patent No.: US 10,219,347 B2
(45) Date of Patent: Feb. 26, 2019

(54) COVE LIGHTING

(71) Applicant: PHILIPS LIGHTING HOLDING B.V., Eindhoven (NL)

(72) Inventors: Bartel Marinus Van De Sluis, Eindhoven (NL); Tim Dekker, Eindhoven (NL); Dzmitry Viktorovich Aliakseyeu, Eindhoven (NL); Philip Steven Newton, Waalre (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/768,178

(22) PCT Filed: Oct. 12, 2016

(86) PCT No.: PCT/EP2016/074399
§ 371 (c)(1),
(2) Date: Apr. 13, 2018

(87) PCT Pub. No.: WO2017/064090
PCT Pub. Date: Apr. 20, 2017

(65) Prior Publication Data
US 2018/0324924 A1 Nov. 8, 2018

(30) Foreign Application Priority Data
Oct. 13, 2015 (EP) ..................... 15189452

(51) Int. Cl.
*H05B 33/00* (2006.01)
*H05B 33/08* (2006.01)
(Continued)

(52) U.S. Cl.
CPC ....... *H05B 33/0872* (2013.01); *F21V 21/005* (2013.01); *F21V 23/0442* (2013.01); *F21V 23/0492* (2013.01); *F21W 2121/008* (2013.01); *F21Y 2103/10* (2016.08); *F21Y 2115/10* (2016.08)

(58) Field of Classification Search
CPC ............ H05B 37/0272; H05B 37/0227; H05B 37/0218; H05B 33/0854; H05B 33/0872; H05B 37/0281; H05B 33/0857; H05B 33/0863; H05B 33/0803; H05B 33/0845; H05B 37/0254; H05B 37/0245; H05B 33/0815
See application file for complete search history.

(56) References Cited

U.S. PATENT DOCUMENTS

2008/0259632 A1 10/2008 Chien
2011/0199769 A1 8/2011 Bretschneider et al.
(Continued)

FOREIGN PATENT DOCUMENTS

DE 102012219894 A1 4/2014
WO 2014115048 A1 7/2014
WO 2015049146 A1 4/2015

*Primary Examiner* — Monica C King
(74) *Attorney, Agent, or Firm* — Meenakshy Chakravorty

(57) ABSTRACT

Presented are concepts for controlling cove lighting. Once such concept provides cove lighting adapted to output decorative light for illuminating the ceiling of an architectural space. The cove lighting comprises a control unit adapted to individually control each of the primary light sources in response to a lighting control signal so that the output decorative light mimics an outdoor lighting condition.

14 Claims, 9 Drawing Sheets

(51) Int. Cl.
*F21V 21/005* (2006.01)
*F21V 23/04* (2006.01)
*F21W 121/00* (2006.01)
*F21Y 103/10* (2016.01)
*F21Y 115/10* (2016.01)

(56) References Cited

U.S. PATENT DOCUMENTS

2012/0206050 A1 8/2012 Spero
2014/0071673 A1 3/2014 Gould et al.
2014/0140052 A1 5/2014 Villard
2014/0292206 A1 10/2014 Lashina et al.
2014/0339989 A1 11/2014 Stockburger
2015/0226392 A1 8/2015 Gould et al.

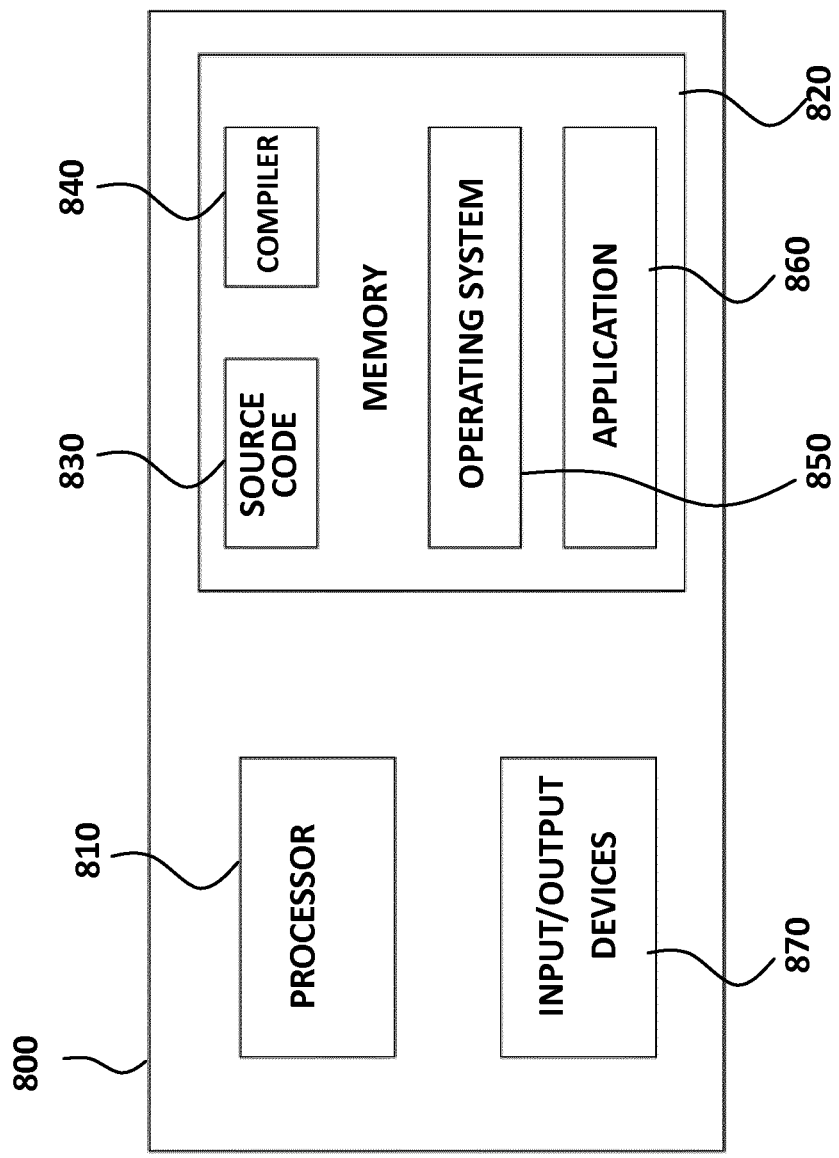

COVE LIGHTING

CROSS-REFERENCE TO PRIOR APPLICATIONS

This application is the U.S. National Phase application under 35 U.S.C. § 371 of International Application No. PCT/EP2016/074399, filed on Oct. 12, 2016, which claims the benefit of European Patent Application No. 15189452.4, filed on Oct. 13, 2015. These applications are hereby incorporated by reference herein.

FIELD OF THE INVENTION

This invention relates to the field of cove lighting and more particularly to controlling light output from cove lighting for illuminating a ceiling of an architectural space.

BACKGROUND OF THE INVENTION

Architectural spaces, such as rooms for example, are often illuminated by either natural light or by artificial light. It is known that illumination of a space can have an impact on how the space is perceived by person in or near the space. For instance, a room is typically perceived to be more spacious if its surfaces (such as walls and/or ceilings) are brightly illuminated. Spaces with well-illuminated walls and ceilings are also typically perceived to be more pleasant.

Current lighting solutions typically illuminate the ceiling of a space using cove lighting (e.g. lighting positioned in a ceiling cove or mounted high up on a wall close to the ceiling). However, the illumination from cove lighting can look un-natural or unpleasant, and the creation of visually attractive illumination from cove lighting can be expensive and/or challenging for non-experts. For example, the distance from the cove and the angle of incidence of light onto the illuminated ceiling can be important aspects for creating a desired intensity and/or uniformity of illumination. If the cove lighting system is poorly designed, it may cause glare and provide non-uniform illumination of a ceiling. It may also fail to provide the type or amount of light necessary to adequately illuminate the space.

The provision of cove lighting that illuminates a ceiling in a visually attractive or pleasant manner is therefore of importance for many lighting applications, including illumination of architectural spaces.

US 2015/226392 A1 discloses a wall recessed two-component luminaires. The two components can include a primary optical subsystem and a secondary optical subsystem. The primary optical subsystem can provide indirect lighting, illuminate an architectural space indirectly by projecting light upward toward a ceiling, and/or provide light with more lumens than the secondary optical subsystem. The secondary optical subsystem can provide direct lighting, illuminate an architectural space horizontally and/or downward, provide lit appearance, direct view color, direct view luminance, and/or lighting for ambience.

SUMMARY OF THE INVENTION

The invention aims to at least partly fulfil the aforementioned needs. To this end, the invention provides devices, systems and methods as defined in the independent claims. The dependent claims provide advantageous embodiments.

Proposed is concept of intelligently controlling individual sections or segments of cove lighting in a manner such that outputs upwardly directed light to illuminate a ceiling of an architectural space in a manner which mimics the appearance or lighting of an outdoor setting. In other words, it is proposed to independently control each of a plurality of light sources in a coordinated manner such that the light sources illuminate a ceiling of a room so that its appearance (to a person located in or near the room, for examples) resembles an outdoor setting, like a clear or cloudy sky for instance. This may result in the ceiling illumination being more aesthetically pleasing and/or appearing more natural. The cove lighting may therefore be formed from a plurality of light source modules that are combined (e.g. joined or connected together) so to provide a virtual elongated luminaire. The virtual elongated luminaire may be installed or managed as single luminaire, whilst the light source modules can be individually controlled in a coordinated manner to replicate realistic daytime lighting on a ceiling. By dynamically controlling each of the light source modules (or segments) individually, the combined output illumination from the plurality of separate light source modules may replicate realistic daytime lighting, including the representation of moving clouds for example. That is, the combined output illumination from the individually controllable light source modules may comprise a non-homogeneous spatial light distribution that, when directed to a ceiling of an architectural space, images or replicates a realistic (optionally dynamic) sky pattern.

Proposed concepts therefore include individually controlling or driving a plurality of consecutive light source modules or segments of cove lighting. A plurality of light source modules may therefore be brought together so as to form a single virtual cove lighting device, and the single virtual lighting device may be controlled using a single control unit/signal that is adapted to individually or separately control each of the light source modules in a coordinated manner so as to provide a single overall desired lighting output (that may replicate an outdoor lighting condition on a ceiling for example). Embodiments may therefore provide for modular cove lighting formed from a plurality of sub-modules (e.g. separate light sources) that provide for design and installation flexibility. For example, the sub-modules may be movable relative so each other so that their relative positioning and/or orientation may be adjusted according to requirements. Furthermore, the modular design may allow for sub-modules to be added and/or removed in order to modify the size, shape, light output capabilities, etc. of the cove lighting device.

There may be provided a cove lighting control system adapted to control cove lighting comprising an array of primary light sources arranged to illuminate a ceiling of an architectural space with decorative light output from the primary light sources, wherein the cove lighting control system comprises: a processing unit adapted to generate a lighting control signal for individually controlling each of the primary light sources in order to output decorative light that mimics an outdoor lighting condition.

Proposed is a concept of individually controlling upwardly directed light sources of cove lighting in a manner such that its upwardly directed output light can illuminate a ceiling of an architectural space to mimic the appearance or lighting of an outdoor setting. In other words, embodiments may be used to independently control a plurality of light sources in a coordinated manner such that the light sources illuminate a ceiling of a room so its appearance to a person located in or near the room resembles an outdoor setting, like a clear or cloudy sky for example. This may result in the ceiling illumination being more aesthetically pleasing and/or appearing more natural. Further, by dynamically controlling each of the light sources individually, the illumination of the ceiling may replicate realistic daytime lighting including the representation of moving clouds for example. Such realistic daytime lighting may replicate conditions of a particular location outside of the room and/or a particular point in time, thus enabling a person situated within the room to visualise or perceive the location even though it may not be physically visible from within the room. The plurality of light sources may be intelligently controlled as if they are pixels, and thus may be used to form 2D/3D light effects. Further, coordinated or sophisticated control methods may be employed with a one-dimensional array of light sources so as to output decorative light comprising 2D/3D light illumination effects.

In embodiments, the generated lighting control signal may be adapted to individually control the colour, intensity, or colour temperature of decorative light output from each of the primary light sources. For instance, the control signal may be used to cause some of the primary light sources to output light of a blue colour and to cause some of the primary light sources to output light of a white colour so that ceiling is illuminated in a manner that mimics the sky with clouds. The control signal may also be used to vary the colour or temperature of the decorative light with time, and this may be done in a manner which simulates the changing appearance of a sky over the course of a sunset or a sunrise for example.

The cove lighting may further comprise an array of secondary light sources adapted to output direct light for illuminating the architectural space below the ceiling. The processing unit may then be further adapted to generate the lighting control signal for individually controlling the secondary light sources to output direct light that mimics an outdoor lighting condition. Thus, there may be proposed a concept of controlling cove lighting in a manner such that its output light can also illuminate the architectural space below the ceiling so that it mimics the appearance or lighting of an outdoor setting. In other words, embodiments may be used to control secondary light sources which illuminate a room such that the room is lit in such a manner that the illumination of the room resembles an outdoor setting, like natural daylight for example. This may result in the illumination of the room being more aesthetically pleasing and/or appearing more natural. Further, by dynamically controlling the lighting, the illumination of the room may replicate realistic daytime lighting. Such realistic daytime lighting may also replicate conditions of a particular location outside of the room, thus enabling a person situated within the room to visualise or perceive the lighting conditions of the location even though it may not be physically visible from within the room.

The processing unit may be adapted to generate the lighting control signal based on at least one of: a position of the cove lighting; an orientation of the cove lighting; a current time; a current date; a geographical location of the cove lighting; and weather information. In this way, cove lighting may be controlled so that it illuminates an architectural space in a manner which reflects real-world attributes or conditions. For example, basing the lighting control signal on the current time may enable variation in the illumination created by the cove lighting according to the time of day. In another example, basing the lighting control signal on the location and orientation of the cove lighting may enable the cove lighting to be controlled in a manner such that it illuminates the ceiling to mimic the position of the sun.

In some embodiments, such exemplary information that may be used to generate the lighting control signal may be provided to the cove lighting control system from an external device for example. Alternatively, or additionally, such information may be obtained from one or more sensors provided by the cove lighting control system. Thus, by way of example, embodiments may further comprise a sensor unit adapted to detect information relating to at least one of: a position of the cove lighting; an orientation of the cove lighting; a current time; a current date; a geographical location of the cove lighting; and weather information, and the processing unit may be adapted to generate the lighting control signal based on detected information from the sensor unit.

Embodiments may therefore be used to control the illumination of a ceiling of an architectural space (such as a room) in a manner such that the appearance of the illumination mimics an outdoor lighting condition. In other words, a plurality of light sources provided in cove lighting may be individually controlled so that they illuminate a ceiling in a manner which replicates or resembles outdoor lighting. In this way, a more natural or visually pleasing lighting may be provided for a ceiling or an architectural space.

Thus, there is proposed a concept for individually controlling each of a plurality of light sources in a coordinated manner so as to illuminate a ceiling and simulate outdoor lighting conditions. By mimicking outdoor lighting conditions through the control of individual light sources of cove lighting, embodiments may provide a pleasant and spacious effect in an architectural space (such as a room, hall, covered area, ballroom, stadium, etc.).

According to another aspect of the invention, there is provided cove lighting for illuminating a ceiling of an architectural space, the cove lighting comprising: an array of primary light sources adapted to output decorative light for illuminating the ceiling; and a control unit adapted to individually control each of the primary light sources in response to a lighting control signal so that the output decorative light mimics an outdoor lighting condition.

Thus, presented are concepts for controlling cove lighting. Once such concept provides cove lighting adapted to output decorative light for illuminating the ceiling of an architectural space, wherein the cove lighting comprises a control unit adapted to individually control each of the primary light sources in response to a lighting control signal so that the output decorative light mimics an outdoor lighting condition.

The control unit may be adapted to individually control the colour, intensity, or colour temperature of the decorative light output from each of the primary light sources in response to the lighting control signal.

In an embodiment, the primary lighting system may be formed from first and second lighting modules (or segments) each providing at least one of the primary light sources. The control unit may then be adapted to control the first and second lighting modules as a single virtual array of primary light sources. Thus, an embodiment may be formed by bringing together multiple, separate lighting modules so that they form a single cove lighting device. For example, a single, elongated linear cove lighting luminaire according to an embodiment may be formed from a plurality of sequentially connected LED-based linear luminaires, and the LED-based linear luminaires may be individually and sequentially controlled in a coordinated manner so as to output overall decorative light that mimics an outdoor lighting condition.

The first and second lighting modules may be adapted to be releasably coupled to each other so that the first and second lighting modules can be decoupled. Further, the first and second lighting modules may be adapted to be movable relative to each other when coupled together.

An embodiment may further comprise a module adjustment arrangement adapted to alter the relative positioning of the first and second lighting modules in response to an arrangement control signal. Also, the arrangement control signal may be derived from the lighting control signal, for example.

Embodiments may also comprise further comprising an array of secondary light sources adapted to output direct light for illuminating the architectural space below the ceiling. Also, the control unit may be further adapted to individually control each of the secondary light sources in response to the lighting control signal so that the output direct light mimics an outdoor lighting condition.

In some embodiments, the lighting control signal may be based on at least one of: a position of the cove lighting; an orientation of the cove lighting; a current time; a current date; a geographical location of the cove lighting; and weather information.

In an embodiment, the cove lighting may further comprise a sensor unit adapted to detect information relating to at least one of: a position of the cove lighting; an orientation of the cove lighting; a current time; a current date; a geographical location of the cove lighting; and weather information, and to generate the lighting control signal based on the detected information. Other types of information may be sensed and/or used for the purpose of generating the lighting control signal. For example, information about the lay-out, surroundings and/or orientation of modules, sections or segments of the cove lighting, such as distance to ceiling, properties of the ceiling, dimensions of the cove, distance to opposite cove lighting elements, etc. may be used to generate a lighting control which optimises the individual control of each light source, module, or segment in order to output decorative light that best mimics an outdoor lighting condition in consideration of the lay-out, surroundings and/or orientation of modules, sections or segments of the cove lighting.

The cove lighting may be adapted to be positioned in coving or mounted on a wall of the architectural space.

Embodiments may further comprise a communication interface adapted to receive the lighting control signal from a remotely located device.

Thus, there may be provided a cove lighting system which comprises multiple (modular) linear lighting elements that can be easily connected to each other to provide a mechanical, power or data/control connection between the lighting elements. The cove lighting system may also receive input information regarding geographic location, orientation, climate conditions, and/or weather conditions, and then adjust the output light based on the received input information. Such information may be obtained from sensors included in the cove lighting system.

Individually control of each light source may enable pixelated control and/or sophisticated up-lighting effect (such as pixelated sky projection) on a ceiling, depending on the arrangement of the light sources. For example, embodiments may enable decorative light to illuminate a ceiling such that it represents white clouds moving across a blue sky.

Proposed cove lighting may also comprise a cove lighting control system according to an embodiment.

According to another aspect of the invention, there is provided a method of controlling cove lighting comprising an array of primary light sources adapted to output illuminate a ceiling of an architectural space with decorative light output from the primary light sources, wherein the cove lighting control system comprises: generating a lighting control signal for individually controlling each of the primary light sources in order to output decorative light that mimics an outdoor lighting condition.

The generated lighting control signal may be adapted to individually control the colour, intensity, or temperature of decorative light output from each of the primary light sources.

In an embodiment, the cove lighting may further comprise an array of secondary light sources adapted to output direct light for illuminating the architectural space below the ceiling, and the method may further comprise: generating the lighting control signal for individually controlling the secondary light sources to output direct light that mimics an outdoor lighting condition.

The step of generating the lighting control signal may comprise: generating the lighting control signal based on at least one of: a position of the cove lighting; an orientation of the cove lighting; a current time; a current date; a geographical location of the cove lighting; and weather information.

In another embodiment, the method may comprise: detecting information relating to at least one of: a position of the cove lighting; an orientation of the cove lighting; a current time; a current date; a geographical location of the cove lighting; weather information; a layout of the cove lighting; surroundings of the cove lighting; orientation of at least one of the plurality of primary light sources; a distance from the cove lighting to the ceiling; properties of the ceiling; and one or more dimensions of the cove, and the step of generating the lighting control signal may comprise: generating the lighting control signal based on detected information.

According to another aspect of the invention, there is provided a computer program product for controlling cove lighting, the cove lighting comprising an array of primary light sources adapted to output decorative light for illuminating a ceiling of an architectural space, wherein the computer program product comprises a computer-readable storage medium having computer-readable program code embodied therewith, the computer-readable program code configured to perform all of the steps of a method according to an embodiment.

According to yet another aspect of the invention there is provided a computer system comprising: a computer program product according to an embodiment; and one or more processors adapted to perform a method according to a proposed embodiment by execution of the computer-readable program code of said computer program product.

A device that provides the lighting control signal (such as a cove lighting control system according to an embodiment) may be remotely located from the cove lighting, and the lighting control signal may be communicated to the cove lighting via a communication link. In this way, a user (such as a building manager) may have an appropriately arranged cove lighting control system that can display information about cove lighting that is remotely located from the user (and the cove lighting control system). Embodiments may therefore enable a user to remotely monitor and control cove lighting using a remotely located cove lighting control system, which may be provided by a laptop, tablet computer, mobile phone, PDA, etc. For example, such devices may provide on-screen selectable lighting programs which, upon selection, show a preview of the mimicked outdoor lighting effect (e.g. a quick preview or time-lapse of the selected light and cloud effect).

Embodiments may further comprise: a server device comprising a cove lighting control system; and a client device comprising a display system. Dedicated data processing means may therefore be employed for the purpose of generating a lighting control signal, thus reducing processing requirements or capabilities of other components or devices of the system.

Alternative embodiments may further comprise a client device, wherein the client device comprises the cove lighting control system and a display system. In other words, a user may have an appropriately arranged client device (such as a laptop, tablet computer, mobile phone, PDA, etc.) which undertakes processing of received data in order to generate a lighting control signal.

Thus, it will be understood that processing capabilities may therefore be distributed throughout the system in different ways according to predetermined constraints and/or availability of processing resources.

Embodiments may therefore be relevant to the field of personal computing devices which a user can operate to generate a lighting control signal. For example, embodiments may enable such a portable computing device to alter decorative light output from the primary lighting system of cove lighting according to an embodiment. Thus, a cove lighting control system may be provided with a display and may be remotely located from cove lighting according to an embodiment. The cove lighting control system may receive a input signals from a user and/or separate sensor units, generate a lighting control signal based on the received signal, and then communicate the generated lighting control signal (via the internet and/or a wireless communication link, for example).

These and other aspects of the invention will be apparent from and elucidated with reference to the embodiment(s) described hereinafter.

BRIEF DESCRIPTION OF THE DRAWINGS

Examples in accordance with aspects of the invention will now be described in detail with reference to the accompanying schematic drawings, in which:

FIG. 9 is a simplified block diagram of a computer within which one or more parts of an embodiment may be employed.

DETAILED DESCRIPTION OF THE EMBODIMENTS

The illustrative embodiments provide concepts for controlling cove lighting systems. Based on a lighting control signal, primary light sources (for illuminating a ceiling) may be separately or individually controlled in order to illuminate a ceiling in a manner which mimics an outdoor lighting condition. Thus, proposed is the concept replicating an outdoor lighting condition by individually controlling each of a plurality of coving light sources of cove lighting. In the context of this disclosure, the term "cove lighting" may be used to refer to the light effect created or rendered by light sources, light source modules, light fixtures or elongated luminaires positioned in a cove or mounted on a wall, or may be used to refer to the light sources, light source modules, light fixtures or elongated luminaires themselves.

Figure 1:
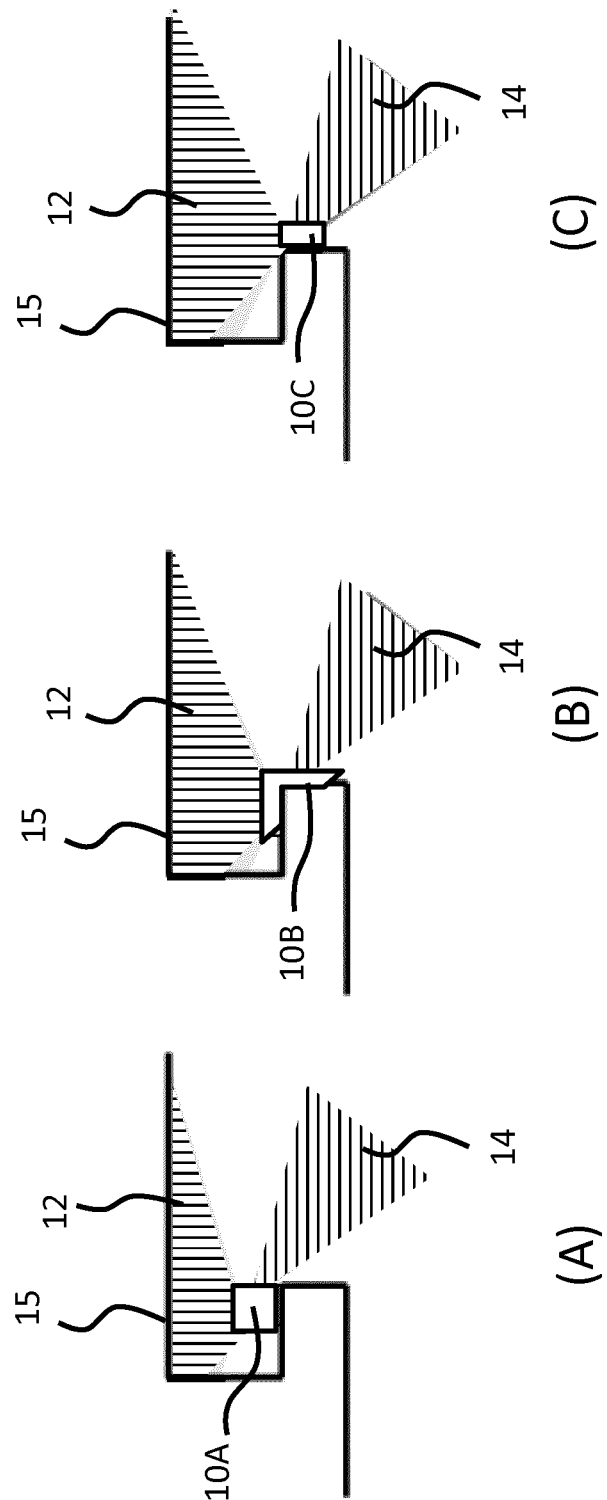
FIG. 1 depicts example form factors of cove lighting in which aspects of embodiments may be implemented.
Figure 2:
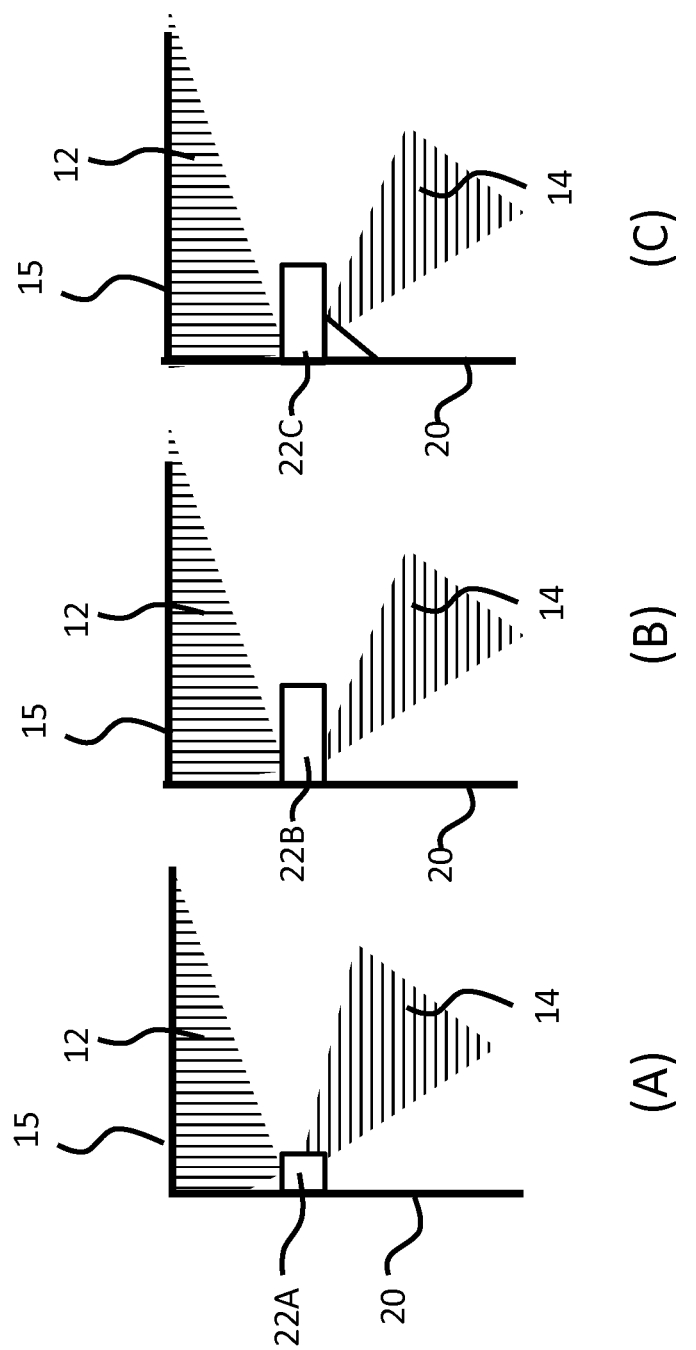
FIG. 2 depicts further example form factors of cove lighting in which aspects of embodiments may be implemented.

Illustrative embodiments may be utilized in many different types of coving lighting systems, such as elongated LED-based up-lighting systems or continuous linear strip lighting for example. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 provide examples only and are not intended to assert or imply any limitation with regard to the environments in which aspects or embodiments of the present invention may be implemented. Many modifications to the depicted environments may be made without departing from the spirit and scope of the present invention.

FIG. 1 shows several possible form factors of cove lighting which enable the cove lighting device to be easily installed (e.g. placed or mounted) into or onto a ceiling cove structure.

FIG. 1A depicts a linear device 10A (e.g. an elongated strip or array of light sources) that is simply placed inside a cove, without necessarily mounting the device. When positioned in the cove, the horizontally extending part provides a plurality of primary light sources and primary optical elements for providing up-lighting 12 for illuminating the ceiling 15, and the vertically-extending part provides a plurality of secondary light sources and secondary optical elements for providing down-lighting 14 for illuminating the space below the ceiling (e.g. the room or hall).

FIG. 1B depicts cove lighting 10B having an L-shaped form factor which can be mounted on the corner of the cove, wherein the horizontally extending part comprise a plurality of primary light sources and primary optical elements for providing up-lighting 12 for illuminating the ceiling 15, and wherein the vertically-extending part comprises a plurality of secondary light sources and secondary optical elements for providing down-lighting 14 for illuminating the space below the ceiling (e.g. the room or hall).

FIG. 1C depicts a mounted strip-like form factor device 10C (e.g. an elongated strip or array of light sources) wherein the top (i.e. upwardly facing surface) of the strip comprises a plurality of primary light sources for providing up-lighting 12 for illuminating the ceiling 15, and wherein the side (i.e. side facing or vertically-extending part) comprises a plurality of secondary light sources for providing down-lighting for illuminating the space below the ceiling (e.g. the room or hall).

It is also possible to have form factors which are optimized for rooms where no cove-like ceiling is available but there is, instead, provided a wall 20. Thus, as shown in FIG. 2, the cove lighting device may be wall-mountable, and may be installed at (e.g. fixed or mounted to) the wall. By way of example, FIG. 2 shows several possible form factors of cove lighting which enable the cove lighting device to be easily installed (e.g. placed or mounted) into or onto a wall that supports or defines a ceiling edge.

FIG. 2A depicts a strip-like form factor device 22A with up-lighting (e.g. ceiling-illuminating) light sources on the top (i.e. upwardly facing surface) and directional down-lighting (e.g. room-illuminating) light sources on the side (i.e. side facing or vertically-extending part). However, it is also possible to give the device 22B a larger width, as depicted in FIG. 2B. Also, as shown in FIG. 2C, the cove lighting device 22C may itself provide a cove-like structure to the room. Optionally, the lighting device may have a finishing that enables it to be easily painted such that the cove lighting device visually blends with the walls and ceiling.

Embodiments of the proposed invention may enhance cove lighting systems (such as those depicted in FIGS. 1 and 2) by providing for the individual control of ceiling-illuminating light sources so as to replicate outdoor lighting conditions (through controlled or strategic illumination of the ceiling).

Proposed concepts are directed toward enabling replication of outdoor lighting conditions through coordinated control of a plurality of different light sources (or sets of light sources) that are provided in a cove lighting system. Further, embodiments may vary or adapt the control over time so as to replicate or simulate changing lighting conditions. Such replication of outdoor lighting conditions may be used to provide natural and/or aesthetically pleasing illumination of an architectural space.

Embodiments are based on the insight that the individual light sources of an array of light sources can be separately controlled in a synchronised or coordinated manner to generate decorative light for illuminating a ceiling so as to replicate outdoor lighting conditions.

In other words, individual light sources of a ceiling-illuminating cove lighting light source array may be controlled to adapt the appearance or characteristics (e.g. temperature, colour, brightness, and/or luminosity) of decorative light that illuminates a ceiling. The decorative light may therefore replicate various outdoor lighting conditions, such as clear sky, overcast sky, scattered clouds, etc. as various times of day, such as sunrise, sunset, midday, midnight early morning, late morning, early evening, late evening, night-time, etc. Outdoor lighting conditions may therefore be mimicked in an outdoor space, for example.

Embodiments are directed toward cove lighting, the cove lighting being for illuminating a ceiling of an architectural space and the cove lighting comprising primary lighting having an array of primary light sources adapted to output decorative light for illuminating the ceiling.

In some embodiments, the cove lighting may also comprise secondary lighting adapted to output direct light for illuminating the architectural space below the ceiling. The primary lighting can be configured to provide decorative or aesthetic lighting for illuminating a ceiling, while the secondary lighting can be configured to illuminate the architectural space.

Also, the primary and/or secondary light may include lenses, reflectors, collimators, diffusing optical elements, controllers, hardware, etc. Generally speaking, the primary lighting may direct light upward relative to the cove lighting to provide decorative lighting for illuminating a ceiling of an architectural space. The secondary lighting can may direct light horizontally and/or downwardly to directly illuminate the architectural space. In some embodiments, both the primary and secondary lighting may illuminate the architectural space from the same coving, wall, wall cavity or cavity. In some embodiments, the combination of primary and secondary lighting may provide an illumination within the architectural space that shares qualities of or is suggestive of natural light.

Figure 3:
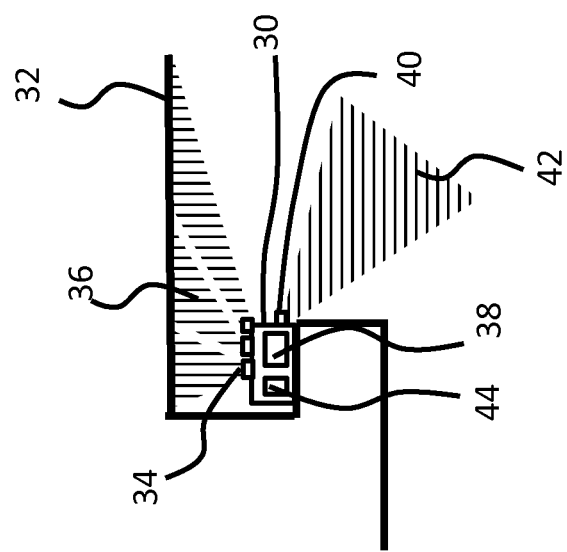
FIG. 3 is a simplified block diagram of cove lighting according to an embodiment.

FIG. 3 shows an embodiment of cove lighting 30 for illuminating a ceiling 32 of an architectural space. The cove lighting 30 comprises an array of primary light sources 34 adapted to output decorative light 36 for illuminating the ceiling 32. The cove lighting also comprises a control unit 38 adapted to individually control each of the primary light sources 34 in response to a lighting control signal so that the output decorative light 36 mimics an outdoor lighting condition.

Here, the control unit 38 is adapted to individually control at least one of the colour, intensity, or temperature of the decorative light 36 output from each of the primary light sources 34 in response to the lighting control signal. For example, the primary light sources 34 may be adapted to project light at different angles of incidence so at to creating a light effect at different areas on the ceiling 32.

Furthermore, using information regarding the layout of the primary light sources (e.g. relative positioning, distances to ceiling, distances to each other, etc.), which may be either indicated by an end-user or derived by system intelligence and sensors, it may be possible to project low-resolution sky projections on the ceiling 32.

For instance, clouds may be projected which gradually move over the ceiling 32. In such an example, the primary light sources 34 for the up-lighting may be adapted to produce light of colours between white and saturated blue. Assuming projection on a white ceiling, various sky patterns can be created ranging from an overcast sky (low intensity up-lighting) to moving clouds (white blobs of light) on a blue background. However, it will be understood that, instead of limiting the colour to white and blue, full colour nodes may be applied. This may enable a full range of possible outdoor lighting conditions, such as a sunrise, sunset, northern lights, fireworks, etc.

A cloudy sky effect might also affect the directional light creating "sun through a cloud" effect by adapting directional light brightness, colour temperature and distribution (e.g. making the brighter part of the directional light wider or narrower). Additionally, multiple structures for up-lighting can be used to achieve an improved effect based on the size of the cove, i.e. to uniformly illuminate the cove area by preventing or adapting to intersections of light effects from opposite sides of the cove.

The embodiment of FIG. 3 also comprises a secondary lighting system having at least one secondary light source 40. The secondary lighting system is adapted to output direct light 42 for illuminating the architectural space below the ceiling 32. Here, the control unit 38 is further adapted to control the secondary light source(s) to output direct light that mimics an outdoor lighting condition. However, it will be appreciated that, in some embodiments having a secondary lighting system, the secondary lighting system need not be controlled, but may instead provide basic direct light 42 that is has static and/or uniform lighting characteristics for the simple illumination of the architectural space.

Also, in the embodiment of FIG. 3, the cove lighting 30 further comprises a sensor unit 44 adapted to detect information relating to at least one of: a position of the cove lighting; an orientation of the cove lighting; a current time; a current date; a geographical location of the cove lighting; and weather information. Based on the detected information, the lighting control signal is generated. Thus, the lighting control signal may be adapted to control at least the primary lighting so that it illuminates the ceiling 32 in a manner which reflects real-world attributes or conditions. For example, basing the lighting control signal on a current time of day may enable variation in the decorative light 36 according to the time of day. In another example, basing the lighting control signal on the location and orientation of the cove lighting may enable the decorative light 36 to be controlled in a manner such that it illuminates the ceiling to mimic the position of the sun.

By way of further example, by basing the lighting control signal on the location and orientation of cove lighting, the primary light sources may be controlled so as to provide a directional light effect which takes into account the location and orientation of the cove lighting. For instance, a directional light effect can be implemented and adjusted so that the directional light effect moves from East to South to West over the duration of a day. This may also follow the climate-based daylight models and/or weather information to provide an accurate representation of outdoor lighting conditions. In some embodiments, it may preferred to implement direction decorative light a single direction. However, in other embodiments, it may be preferable to generate directional decorative light predominantly from primary light sources having a direction which corresponds with the current location of the sun, and generate less light from the primary light sources at other orientations/directions.

In alternative embodiments, information about the location and/or orientation may be provided from an external device, detected by integrated sensors (e.g. compass, GPS), or set by a user.

The control unit 38 may receive information regarding current weather conditions, and then generate the lighting control signal based on this information. For instance, on an overcast day, the lighting control signal may be generated so as to control the primary light sources to create less directional decorative light 36, and also to create a sky effect that is more white than blue. On a sunny day, however, the lighting control signal may be generated so as to control the primary light sources to project a saturated blue sky on the ceiling and to control the secondary lighting to provide directional light which predominantly shines from a direction corresponding with the position of the sun. In order to prevent discomfort and glare, such directional light may be subtle and need not be of high intensity.

The lighting control signal may also be adapted to control the colour temperature of the decorative light 36 and/or the direct light 42 to reflect the time of the day (e.g. warmer colour temperature in the evening and colder in the morning).

To provide a realistic, daylight-mimicking effect, embodiments may employ an array of secondary light sources 40 adapted to output direct light (e.g. down-lighting) for illuminating the architectural space below the ceiling 32. The control unit 38 may then be further adapted to individually control each of the secondary light sources 40. By way of example, the control unit 38 may control the light intensity and/or colour temperature output by each of the secondary light sources 40 in accordance with a lighting control signal. In addition, the secondary light sources 40 may be provided in conjunction with optical elements that are adapted to create collimated, directional down-lighting.

Figure 4:
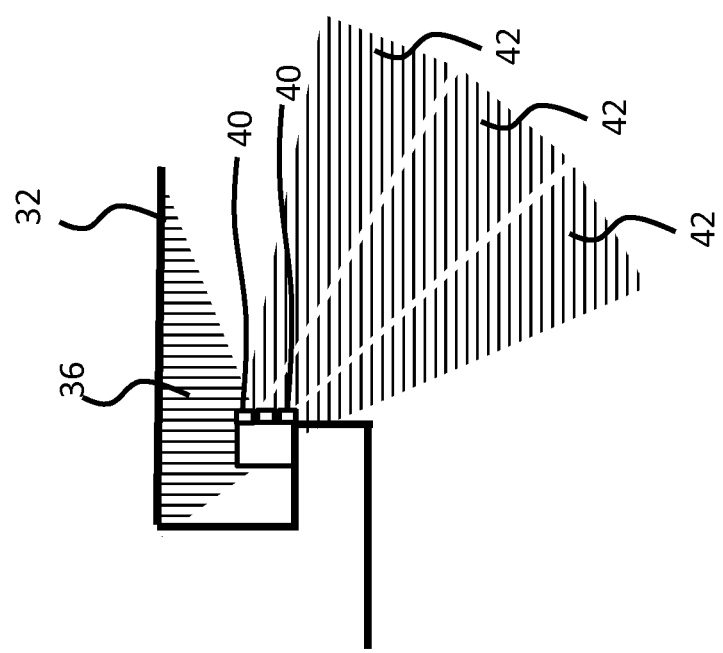
FIG. 4 is a simplified block diagram of cove lighting according to another embodiment.

An example of such an embodiment employing an array of secondary light sources 40 is depicted in FIG. 4.

The directional down-lighting secondary light sources 40 may be adapted to shine white light downwardly at a fixed angle. However, it may also be desirable to adjust this angle to a situation in the room, or, alternatively to change the angle of the directional light in order to mimic a specific daylight effect which for instance, matches the time of day, the season or geographic location for which a daylight effect is being mimicked.

By way of example, adjustment of the angle of the direct light from the secondary light sources 40 may be achieved using a mechanical adjustable arrangement. This may be either be a series of movable individual secondary light sources 40 or a bar with an array of spotlights which can be rotated as a whole, for example Control of the mechanical arrangement may be manual, motorised, electronically controlled, or a combination thereof.

Alternatively, adjustment of the angle of the direct light from the secondary light sources 40 may be achieved using an arrangement of the secondary light sources 40, each being at a specific down-lighting angle. This may allow digital control of the desired beam angles. For instance, in the morning, the direct light from the secondary light sources 40 may be adapted to be at a smaller ceiling angle, whereas at noon this angle would be larger making it more vertical.

By proving the light sources with embedded orientation sensors, the control unit 38 may use information from the orientation sensors to correlate the orientation of the light sources to the time-of-day.

In an embodiment, the cove lighting may comprise first and second segments each supporting at least one of the light sources, wherein the first and second segments are adapted to be movable relative to each other. Such a structure for cove lighting may enable easy installation whilst also enabling the light from light sources to be directed in multiple different angles. For example, moving the first and second segments relative to each other can enable the shape and/or size of the cove lighting to be changed, thereby modifying the width and height of the cove lighting so it can be installed into a desired space or location for example.

Thus, there is proposed a support structure for a plurality of light sources provided in cove lighting that may allow a user to adapt the shape and orientation of the cove lighting to the dimensions of a particular cove. It may also provide both directional decorative light (e.g. up-lighting) for illuminating a ceiling and direct light (e.g. down-lighting) for illumination a space below the ceiling). The support structure may be adjustable in length and comprise movably coupled segments or section that enables a user to fold the segments/sections relative to each other so as to form a desired shape. In this way, the direction of output light from the cove lighting may be easily adjusted to meet requirements. To support the light sources (such as LEDs for example), the support structure may comprise mechanical supports and electrical connectors for connection of the light sources.

Accordingly, it will be understood that various embodiments are possible wherein: (i) a linear support structure enables easy attachment of individual linear LED light sources devices; (ii) a cove lighting device comprises integrated linear lighting arrays on an orientation-adjustable support structure; or (iii) a modular device is formed from a plurality of connectable modules, each module comprising: a mechanical support structure element; an array of light sources; and means to connect the modules to each other. Further, the connection means may also permit movement (e.g. rotation) of the modules relative to each other (like a hinge arrangement for example).

Figure 5:
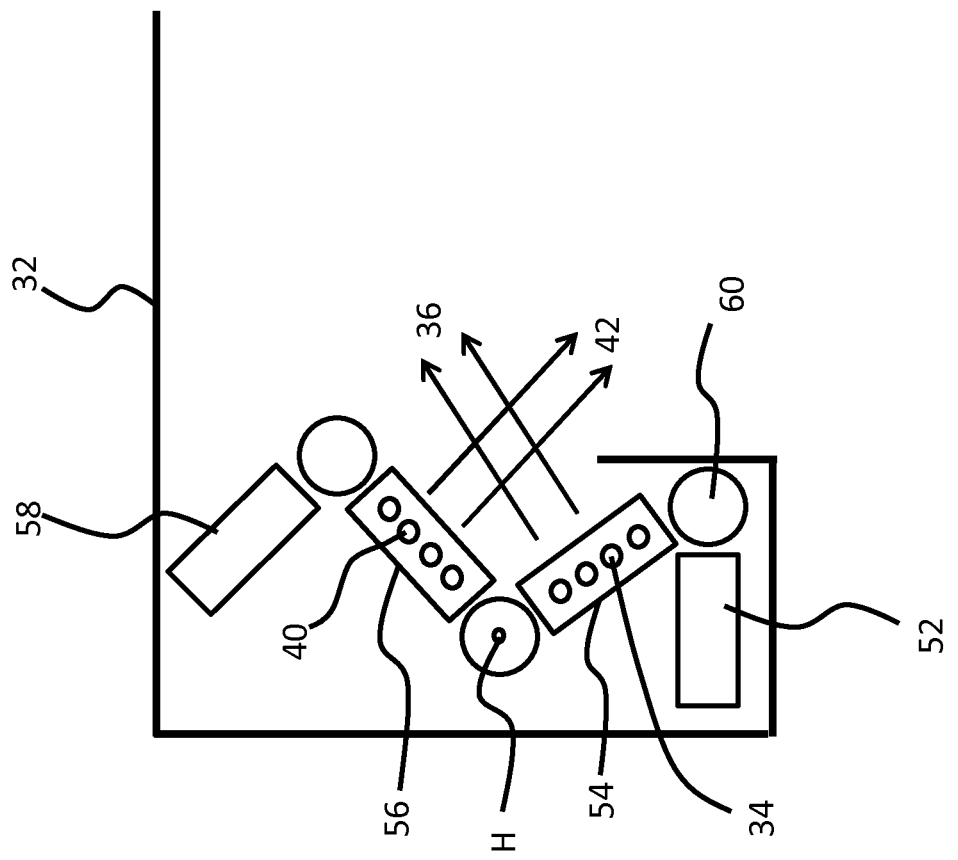
FIG. 5 is a simplified block diagram of cove lighting according to yet another embodiment.

Referring now to FIG. 5, there is depicted an exemplary embodiment of cove lighting 50 comprising first 52 to fourth 58 lighting modules (or segments).

Here, the second lighting module 54 comprises an elongate linear support supporting an array of primary light sources 34 adapted to output decorative light 36 (e.g. up-lighting) for illuminating a ceiling 32 of an architectural space. The third lighting module 56 comprises an elongate linear support supporting an array of secondary light sources 40 adapted to output direct light 42 (e.g. down-lighting) for illuminating the architectural space below the ceiling 32.

The second 54 and third 56 lighting modules are releasable connected to each other via a 'snap-fit' hinging mechanism 60 that permits the second 54 and third 56 lighting modules to move relative to each other. In this example, the hinging mechanism 60 permits the second 54 and third 56 supports to rotate relative to each other about a hinging axis H.

Preferable embodiments may further comprise a lighting module adjusting arrangement that is adapted to alter the relative positioning of the lighting modules in response to an arrangement control signal. Such an arrangement may, for example, comprise a mechanical or electromechanical arrangement which is activated to move the lighting modules in accordance with an arrangement control single supplied via a mechanical or electrical/electronic interface. The arrangement control signal may, for example, be provided by a user via an input interface and/or derived from the lighting control signal.

For instance, the embodiment of FIG. 5 may be adapted to include an embedded controller and sensors (e.g. 3D accelerometer and gyroscope) from which it can determine the orientation of the lighting modules and adjust the relative positions of the modules and/or adjust the light output from the light sources accordingly. Additionally, user- or sensor-supplied information about the geographical location of the cove lighting may be used to allow the controller to create daylight mimicking effects.

An impression of a daylight effect may be enhanced, for example, by controlling the primary light sources to project a sky-like impression upwards to the ceiling 32 with blue-ish light. A natural, white light may then be project downwards into the room using the secondary light sources. Manipulation of the relative positions of the segments/section may then be used to alter the daylight effect over time, for example.

The embodiment of FIG. 5 may be modular, wherein the lighting modules are adapted to be releasably coupled to each other so that they can be decoupled. This may enable the cove lighting 50 to be re-arranged or modified according to requirements, such as the shape and size of the coving for example. The sequential ordering and/or number of the lighting modules (from one end of the cove lighting 50 to the other) may therefore be modified by adding or removing lighting modules. For example, additional lighting module may be connected so as to increase the overall length of the cove lighting.

Figure 6:
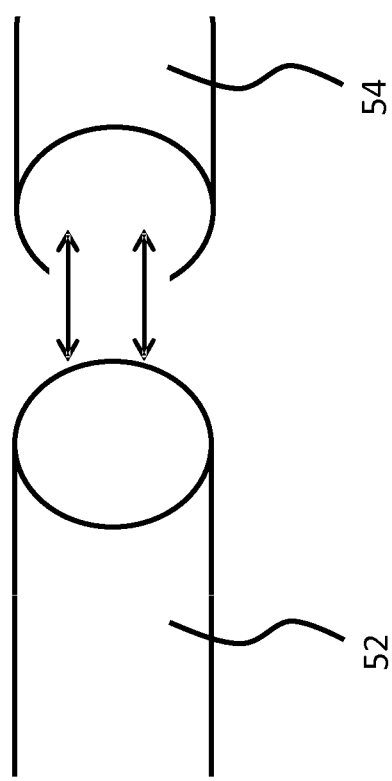
FIG. 6 illustrates a concept for connecting first and second segment of cove lighting according to an embodiment.

For example, as depicted in FIG. 6, segments may be designed to have a standard width and/or standard connection means so that multiple lighting modules may be combined to create a cove lighting device of desired shape and/or length. Here, the example of FIG. 6 is adapted to employ 'snap-fit' joints, wherein the end of a first lighting module 52 has a shape that is designed to cooperate with the end of a second lighting module 54 so as to provide for a releasable coupling between the first 52 and second 54 lighting modules. In other words, the ends of the first 52 and second 54 lighting modules may have complementary geometries that are adapted to cooperate with each other so as to provide for a releasable coupling between the first 52 and second 54 lighting modules when they are brought together.

It will be appreciated that such an embodiment may be adjustable in length by 'clicking on' additional segments. Also, LED light strips of various types can be provided by (e.g. mounted on or supported by) the lighting modules, thus enabling the cove lighting to be reconfigured with different light sources through the addition or removal of lighting modules. Also, the coupling means may be adapted (like a ball and socket joint for example) to allow the lighting modules to rotate and/or change orientation in relation to each other. This can allow a user to configure the decorative lighting and/or the direct lighting.

Sensors may also be employed to detect the orientation of the lighting modules and adjust the light output accordingly, thereby assisting a user to obtain a desired lighting arrangement or effect. Embodiments may therefore make it easy for novice users to install and create high quality cove lighting.

From the above description, it will be understood that embodiments may provide a number of advantages, particularly for cove lighting that comprise elongated arrays of LED light sources that are adapted to provide up-lighting for illuminating a ceiling when installed.

For example, proposed embodiments may allow light from the light sources to be directed in multiple different angles and may also be adjustable in width and/or height. The light sources may be integrated within lighting modules, or may comprise linear LED lighting devices that are adapted to be coupled or connected to other lighting modules.

Optical components may be integrated into each lighting module. Also, a user or controller may set which lighting modules become active and which lighting modules should be disabled. This may be achieved through something as simple as a switch on each module. Lighting modules which are oriented beyond a certain angles (for example completely horizontal or vertical) may be disabled. For example, in an extended embodiment, the orientation of the lighting modules may be detected using an orientation sensor embedded in each lighting module. Data from the orientation sensor may be provided to a controller that controls the light output of the connected light sources. If every lighting module comprises one or more LED light sources, the control of the light output from the LED light sources may be individually controlled by the controller based on the orientation of each lighting module. For instance, the light output of a LED may be reduced when the orientation of the lighting module is aimed down to minimize glare. When the lighting module is pointing upwards, the light output may be increased to help ensure that the whole area (e.g. ceiling) above the cove is lit.

It will be understood the cove lighting according to an embodiment may therefore be formed from a plurality of light sources (e.g. lighting modules) that are combined (e.g. joined or connected together) so to provide a single, virtual elongated luminaire. The virtual elongated luminaire may be installed or managed as single luminaire, whilst the lighting modules may be individually controlled in a coordinated manner so as to replicate realistic daytime lighting on a ceiling.

By dynamically controlling each of the light modules (or segments) individually, the combined output illumination from the plurality of lighting modules may replicate realistic daytime lighting, including the representation of moving clouds for example. Put another way, a plurality of consecutive lighting modules or segments of cove lighting may be individually controlled or driven to create a desired decorative output illumination.

A plurality of lighting modules may therefore be brought together so as to form a single virtual cove lighting device, and the single virtual lighting device may be controlled using a single control unit/signal that is adapted to individually or separately control each of the lighting modules in a coordinated manner so as to provide a single overall desired lighting output (that may replicate an outdoor lighting condition on a ceiling for example).

Figure 7:
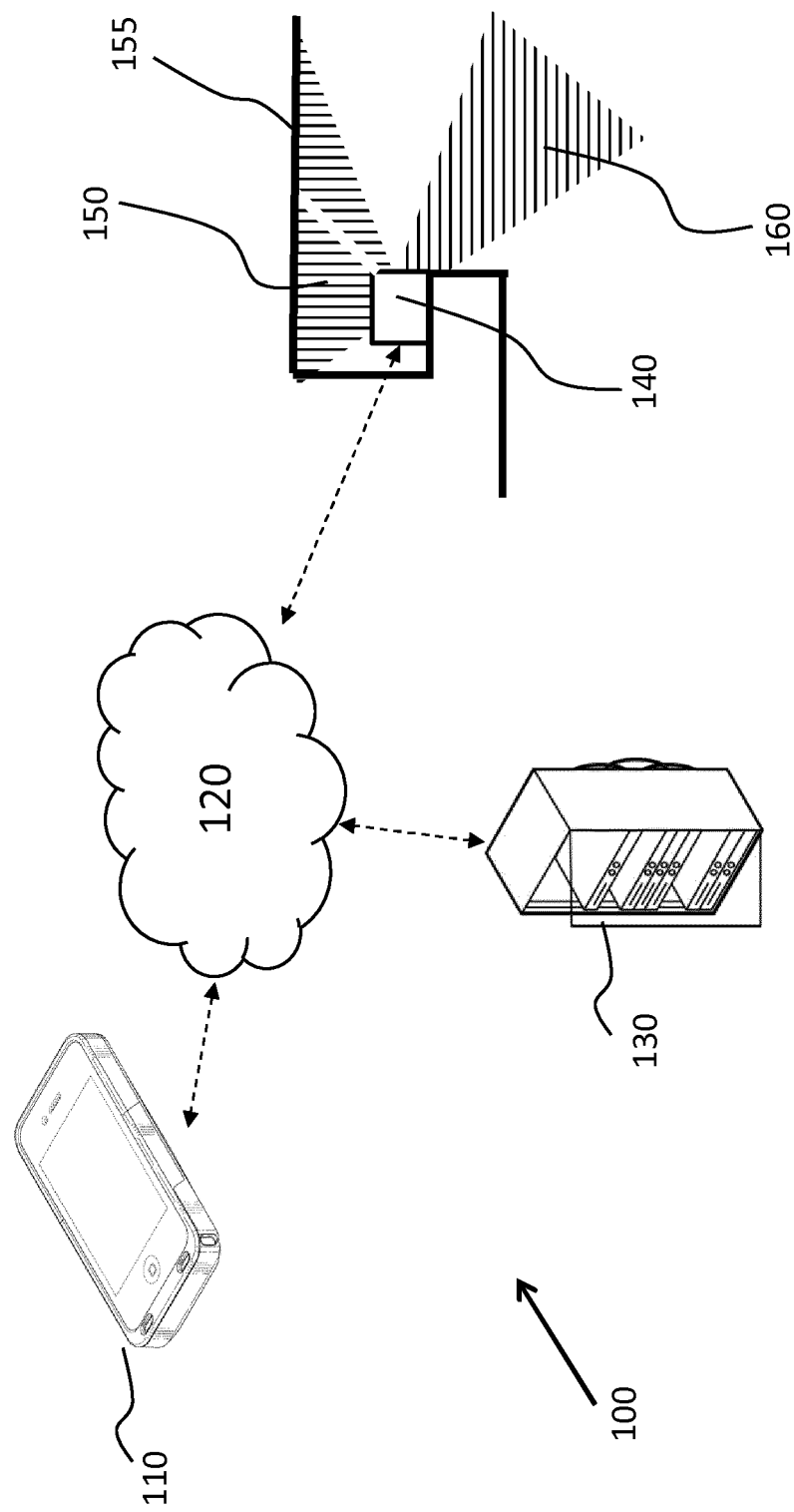
FIG. 7 is schematic block diagram of a cove lighting system according to an embodiment.

Referring now to FIG. 7, there is depicted an embodiment of a cove lighting system 100 according to an embodiment. The cove lighting system 100 comprises a mobile computing device 110.

Here, the portable computing device 110 is a mobile telephone device (such as a smartphone) with user interface for receiving user inputs and a display for displaying graphical elements to the user. In other embodiments, the portable computing device may be another type of portable computer or data processing device, such as a Laptop or Tablet computer with a user interface for receiving user inputs. The portable computing device 110 generates output signals based on received user input and communicates its output signals via the internet 120 (using a wired or wireless connection for example) to a remotely located data processing system 130 (such as server).

The data processing system 130 is adapted to receive the one or more output signals from the portable computing device 110 and to process the received signal(s) in accordance with a lighting control algorithm in order to determine lighting control requirements. The data processing system 130 is further adapted to generate a lighting control signal for individually controlling each of a plurality of primary light sources that are adapted to output decorative up-lighting for illuminating a ceiling of an architectural space. Here, the lighting control signal is adapted to controlling each of a plurality of primary light sources in order to output decorative light that mimics an outdoor lighting condition.

Thus, the data processing system 130 provides a centrally accessible processing resource that can receive information from a remotely located device, such as a network node or device of the cove lighting system, and run one or more algorithms to transform the received information into a lighting control signal for individually controlling each of a plurality of light sources. Information relating to the control signal and/or lighting requirements can be stored by the data processing system 130 (for example, in a database) and provided to other components of the system. Such provision of information about the lighting control signal and/or lighting requirements may be undertaken in response to a receiving a request (via the internet 120 for example) and/or may be undertaken without request (i.e. 'pushed').

For the purpose of outputting upwardly oriented decorative light, and thus to enable an outdoor lighting condition to be mimicked on a ceiling, the system further comprises a cove lighting arrangement 140.

Here, the cove lighting arrangement 140 comprises primary lighting formed from an array of primary light sources adapted to output upwardly directed decorative light 150 for illuminating the ceiling 155 above or adjacent the cove. The cove lighting arrangement 140 also comprises secondary lighting adapted to output downwardly directed direct light 160 for illuminating the architectural space below the ceiling 155. Based on received lighting control signals, the primary lighting can be configured to provide decorative or aesthetic lighting for illuminating the ceiling 155, and the secondary lighting can be configured to illuminate the architectural space.

The data processing system 130 is adapted to communicate output lighting control signals to the cove lighting arrangement 140 via the internet 520 (using a wired or wireless connection for example). As mentioned above, this may (or may not) be undertaken in response to receiving a request from the cove lighting arrangement 140.

Based on a received lighting control signal, the cove lighting arrangement 140 is adapted to individually control each of the primary light sources so that the output decorative light 150 mimics an outdoor lighting condition. For this purpose, the cove lighting arrangement 140 comprises a software application for processing, decrypting and/or interpreting received lighting control signals in order to determine how to individually control each of the primary light sources. Thus, the cove lighting arrangement 140 comprises a processing arrangement to generate signals for modifying the decorative light output by each of the primary light sources.

The cove lighting system can therefore communicate lighting control information the cove lighting arrangement 140. For example, cove lighting arrangement 140 may be used to illuminate a room, hallway, covered area, roofed stadium, or other covered architectural space.

Implementations of the system of FIG. 7 may vary between: (i) a situation where the data processing system 130 communicates implementation-ready lighting control signals, which may for example comprise control data comprising complete lighting control instructions that are simply executed by the cove lighting arrangement; to (ii) a situation where the data processing system 130 communicates raw user input information that the cove lighting arrangement 140 then processes to determine lighting control requirements, and then internally generates lighting control signals for individually control each of a plurality of primary light sources so as to output decorative light 150 which mimics an outdoor lighting condition on the ceiling (for example, using local software or data processing algorithms). Of course, in other implementations, the processing may be shared between the data processing system 130 and a receiving cove lighting arrangement such that part of the lighting control information generated at data processing system 130 is sent to the cove lighting arrangement 140 for further processing by local dedicated software of the cove lighting arrangement 140. Embodiments may therefore employ server-side processing, client-side processing, or any combination thereof.

Further, where the data processing system 130 does not 'push' lighting control information (e.g. lighting control output signals), but rather communicates information in response to receiving a request, the device making such a request may be required to confirm or authenticate their identity and/or security credentials in order for information to be communicated.

It is also noted that the lighting system 100 may comprises a plurality of sensors adapted to detect values of real-world attributes or conditions, such as the positioning of the cove lighting arrangement; an orientation of the cove lighting arrangement; a current time; a current date; a geographical location of the cove lighting; or weather information. Such sensors may be provided as part of the cove lighting arrangement 140 and/or by the portable computing device 110. In other words, various embodiments may employ various arrangements of one or more sensors at a range of locations or devices in the cove lighting system. The sensors may be adapted to output one or more signals which are representative of the sensed values, and these signals may be then be processed to determine lighting control requirements for the cove lighting arrangement 140. Lighting control signals may therefore be based on real-world attributes or conditions detected by the sensor(s).

Figure 8:
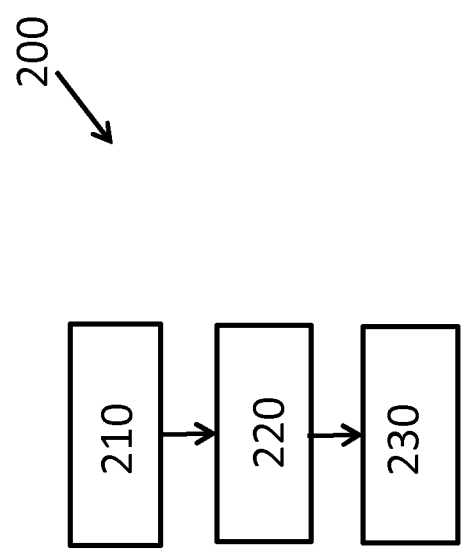
FIG. 8 shows a flow diagram of a method according to an embodiment.

Referring now to FIG. 8, there is shown a flow diagram of a method 200 of controlling cove lighting according to an embodiment. For this purpose of describing this embodiment, it is noted that the cove lighting comprises an array of primary light sources adapted to output decorative light for illuminating a ceiling of an architectural space.

The method begins with step 210 in which real-world attributes or conditions are obtained. In particular, the example of this embodiment obtain such information about the cove lighting and/or its surrounding environment by detecting information relating to at least one of: a position of the cove lighting; an orientation of the cove lighting; a current time; a current date; a geographical location of the cove lighting; and weather information.

Next, in step 220, the method undertakes the step of generating a lighting control signal for individually controlling each of the primary light sources in order to output decorative light that mimics a predetermined outdoor lighting condition. More specifically, in this examples, the step 220 of generating the lighting control signal is based on (e.g. employs, use, processes, or makes us of) information obtained in step 210. Here, in order for the decorative light to mimic a predetermined outdoor lighting condition, the lighting control signal is generated so that is can be used to individually control the colour, intensity, or temperature of decorative light output from each of the primary light sources of the cove lighting.

Finally, in step 230, the generated lighting control signal is output and communicated to the cove lighting via a communication link (such as a wired or wireless connection for example).

Thus, by way of example, the cove lighting control method 200 may be implemented in a portable computing device (such as the portable computing device shown in FIG. 7) in order to individually control each of a plurality of light sources that are adapted to provide upwardly directed decorative light for illuminating a ceiling.

In alternative embodiments, wherein the cove lighting further comprises an array of secondary light sources adapted to output direct light for illuminating the architectural space below the ceiling, the step 200 of generating the lighting control signal may be adapted to generate the lighting control signal for individually controlling the secondary light sources to output direct light that mimics an outdoor lighting condition.

From the above description, it will be understood that embodiments may provide a number of advantages, particularly for cove lighting that comprise an elongated strip of LED light sources that are adapted to provide up-lighting for illuminating a ceiling when installed.

For example, a plurality of light sources may be individually controlled in a coordinated manner so as to illuminate a ceiling to replicate an outdoor lighting condition. This may provide cove lighting having a natural and pleasant appearance.

Each of the light sources may be controlled in a dynamic or changing manner so the replicated outdoor lighting condition changes or varies over time.

Embodiments may enable intelligent illumination of a ceiling of an architectural space since the control of the light sources may be based on information about real-world attributes or conditions. This may improve a viewing experience of the architectural space.

FIG. 9 illustrates an example of a computer 800 within which one or more parts of an embodiment may be employed. Various operations discussed above may utilize the capabilities of the computer 800. For example, one or more parts of a data analysis system (or display unit thereof) may be incorporated in any element, module, application, and/or component discussed herein.

The computer 800 includes, but is not limited to, PCs, workstations, laptops, PDAs, palm devices, servers, storages, and the like. Generally, in terms of hardware architecture, the computer 800 may include one or more processors 810, memory 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. Furthermore, the application 860 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, JavaScript, FORTRAN, COBOL, Perl, Java, ADA, .NET, and the like.

The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description has been presented for purposes of illustration and description, and is not intended to be exhaustive or limited to the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand various embodiments with various modifications are contemplated.

The invention claimed is:

1. Cove lighting for positioning in a cove or mounting on a wall, the cove lighting comprising:
    an array of individually controllable primary light sources adapted to, when positioned in a cove or mounted on a wall, provide light to an architectural space by projecting decorative light from the array of individually controllable primary light sources onto a ceiling of the architectural space; and
    a control unit adapted to individually control a light output of each of the primary light sources in response to a lighting control signal so that the decorative light output from the array of individually controllable primary light sources mimics an outdoor lighting condition,
    wherein the primary light sources are controllable as individual pixels for outputting the decorative light as a pixelated sky projection.

2. The cove lighting of claim 1, wherein the control unit is adapted to individually control the colour, intensity, or colour temperature of the light output from each of the primary light sources in response to the lighting control signal.

3. The cove lighting of claim 1, wherein the cove lighting is formed from lighting modules each providing at least one of the primary light sources, and wherein the control unit is adapted to control the lighting modules as a single virtual array of primary light sources.

4. The cove lighting of claim 3, wherein the lighting modules are adapted to be releasably coupled or decoupled to each other so that the lighting modules may be added or removed from the cove lighting to increase or decrease an overall length of the cove lighting.

5. The cove lighting of claim 1, further comprising an array of individually controllable secondary light sources adapted to provide direct light for illuminating the architectural space below the ceiling, and wherein the control unit is further adapted to individually control a light output of each of the secondary light sources in response to the lighting control signal so that the direct light mimics the outdoor lighting condition.

6. The cove lighting of claim 1, further comprising a sensor unit adapted to detect information relating to at least one of: a position of the cove lighting; an orientation of the cove lighting; a current time; a current date; a geographical location of the cove lighting; weather information; a layout of the cove lighting; surroundings of the cove lighting; orientation of at least one of the plurality of primary light sources; a distance from the cove lighting to the ceiling; properties of the ceiling; and one or more dimensions of the cove, and to generate the lighting control signal based on the detected information.

7. A Cove lighting system comprising a cove lighting of claim 1, and further comprising a processing system adapted to generate the lighting control signal based on one or more of a current time, a current date, a geographical location and weather information.

8. A method of controlling cove lighting positioned in a cove or mounted on a wall, the cove lighting comprising an array of individually controllable primary light sources adapted to provide light to an architectural space by projecting decorative light from the array of individually controllable primary light sources onto a ceiling of the architectural space, wherein the method comprises:
generating, based on one or more of a current time, a current date, a geographical location and weather information, a lighting control signal for individually controlling a light output of each of the primary light sources in order that the decorative light output from the array of individually controllable primary light sources mimics an outdoor lighting condition,
wherein the primary light sources are controllable as individual pixels for outputting the decorative light as a pixelated sky projection.

9. The method of claim 8, further comprising:
detecting information relating to at least one of: a position of the cove lighting; an orientation of the cove lighting; a current time; a current date; a geographical location of the cove lighting; and weather information; a layout of the cove lighting; surroundings of the cove lighting; orientation of at least one of the plurality of primary light sources; a distance from the cove lighting to the ceiling; properties of the ceiling; and one or more dimensions of the cove, and
generating the lighting control signal further based on the detected information.

10. A computer program product for controlling cove lighting according to claim 1,
wherein the computer program product comprises a computer-readable storage medium having computer-readable program code embodied therewith, the computer-readable program code configured to execute on a processing system.

11. The cove lighting of claim 2, wherein the cove lighting comprises further lighting modules each providing at least one of the secondary light sources, and wherein the cove lighting comprises a module adjustment arrangement adapted to alter the relative positioning of the lighting modules and further lighting modules in response to an arrangement control signal.

12. The cove lighting of claim 1, wherein at least one of the array of individually controllable primary light sources and the array of individually controllable secondary light sources comprises a two-dimensional array of light sources adapted to output light in multiple directions.

13. The cove lighting system of claim 7, wherein the processing system is adapted to generate the lighting control signal further based on at least one of: a position of the cove lighting; an orientation of the cove lighting; a layout of the cove lighting; surroundings of the cove lighting; orientation of at least one of the plurality of primary light sources; a distance from the cove lighting to the ceiling; properties of the ceiling; and one or more dimensions of the cove.

14. The cove lighting system of claim 13, wherein the processing system is adapted to generate the lighting control signal based on detected information from the sensor unit.

* * * * *